United States Patent
Mataga et al.

(10) Patent No.: US 10,156,493 B2
(45) Date of Patent: Dec. 18, 2018

(54) POSITION DETERMINATION DEVICE, POSITION DETERMINATION SYSTEM, POSITION DETERMINATION METHOD, AND COMPUTER-READABLE RECORDING MEDIUM

(71) Applicant: NEC Corporation, Tokyo (JP)

(72) Inventors: Junichiro Mataga, Tokyo (JP); Shin Tominaga, Tokyo (JP); Masatake Takahashi, Tokyo (JP); Hirofumi Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 192 days.

(21) Appl. No.: 15/319,606

(22) PCT Filed: Jun. 11, 2015

(86) PCT No.: PCT/JP2015/002936
§ 371 (c)(1),
(2) Date: Dec. 16, 2016

(87) PCT Pub. No.: WO2015/194138
PCT Pub. Date: Dec. 23, 2015

(65) Prior Publication Data
US 2017/0322104 A1 Nov. 9, 2017

(30) Foreign Application Priority Data
Jun. 16, 2014 (JP) .................................. 2014-123450

(51) Int. Cl.
*G01M 3/24* (2006.01)
*G01H 1/04* (2006.01)
*G01H 1/06* (2006.01)

(52) U.S. Cl.
CPC .............. *G01M 3/243* (2013.01); *G01H 1/06* (2013.01)

(58) Field of Classification Search
CPC .. G01H 1/00; G01H 1/04; G01H 1/06; G01H 1/08; G01M 3/00; G01M 3/18; G01M 3/24; G01M 3/243
See application file for complete search history.

(56) References Cited

U.S. PATENT DOCUMENTS 6,595,038 B2 * 7/2003 Williams ................ G01M 3/24
73/40.5 A
9,759,629 B2 * 9/2017 Tomiyama ............. G01M 3/243
(Continued)

FOREIGN PATENT DOCUMENTS

JP H01-276037 A 11/1989
JP H02-003127 B 1/1990
(Continued)

OTHER PUBLICATIONS

International Search Report corresponding to PCT/JP2015/002936, dated Sep. 8, 2015 (5 total pages).

*Primary Examiner* — Nguyen Ha
(74) *Attorney, Agent, or Firm* — Wilmer Cutler Pickering Hale and Dorr LLP

(57) ABSTRACT

Provided are a position determination device and the like for determining a mounting position of a sensor suitable for detecting leakage vibration of a pipe. A position determination device (100) includes a frequency determination unit for determining a frequency of vibration propagating through a pipe and a structure attached to the pipe and a mounting position determination unit for determining, on the basis of the determined frequency, a mounting position of a sensor for detecting vibration of the pipe.

9 Claims, 13 Drawing Sheets

(56) References Cited

U.S. PATENT DOCUMENTS

2012/0007744 A1    1/2012  Pal et al.
2015/0253215 A1*  9/2015  Tomiyama ............ G01M 3/243
                                                            340/605

FOREIGN PATENT DOCUMENTS

| JP | H03-079651 B | | 12/1991 | |
| --- | --- | --- | --- | --- |
| JP | H06-281530 A | | 10/1994 | |
| JP | 2006138638 A | * | 6/2006 | ............. G01M 3/24 |
| JP | 2014-074611 A | | 4/2014 | |

\* cited by examiner

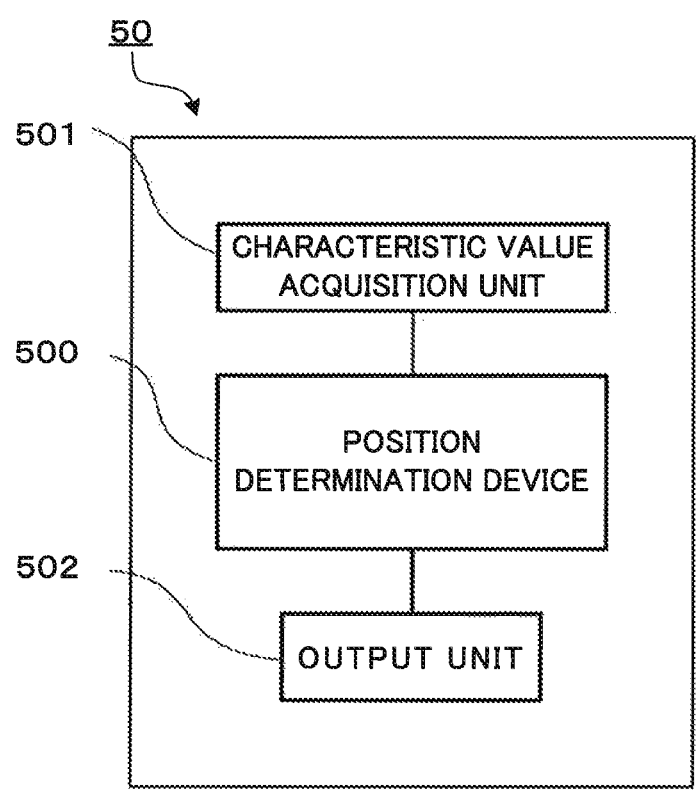

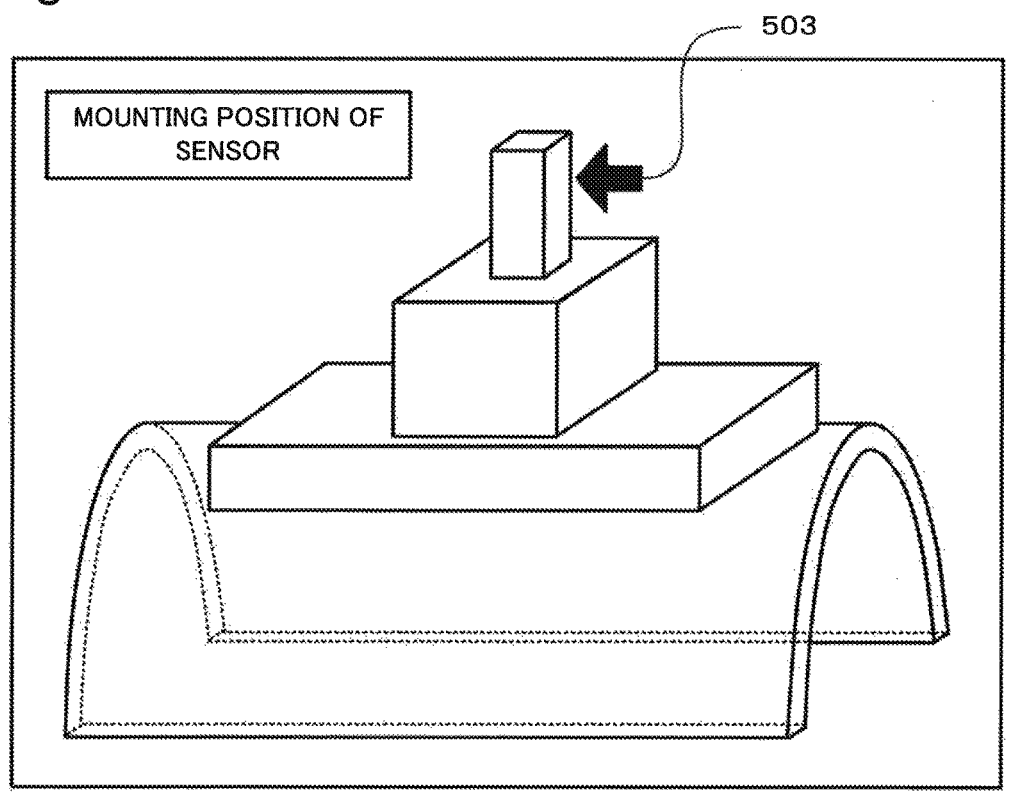

Fig.11

| INPUT OF CHARACTERISTIC VALUES | | | | |
|---|---|---|---|---|
| PIPE DIAMETER | | mm | | |
| PIPE MATERIAL | | | | |
| FIRE HYDRANT SIZE | × | × | mm | |
| FIRE HYDRANT MATERIAL | | | | |
| FIRE HYDRANT SHAPE | | | | |

POSITION DETERMINATION DEVICE, POSITION DETERMINATION SYSTEM, POSITION DETERMINATION METHOD, AND COMPUTER-READABLE RECORDING MEDIUM

CROSS REFERENCE TO RELATED APPLICATIONS

This application is a national stage application of International Application No. PCT/JP2015/002936 entitled "POSITION DETERMINATION DEVICE, POSITION DETERMINATION SYSTEM, POSITION DETERMINATION METHOD, AND COMPUTER-READABLE RECORDING MEDIUM", filed on Jun. 11, 2015, which claims the benefit of the priority Japanese Patent Application No. 2014-123450, filed on Jun. 16, 2014, the disclosures of each of which are hereby incorporated by reference in their entirety.

TECHNICAL FIELD

The present invention relates to a position determination device, a position determination system, a position determination method, and a computer-readable recording medium.

BACKGROUND ART

Various methods have been proposed as techniques for detecting a presence or absence of a water leakage in a tap water supply network, a gas leakage from a gas pipe and a fluid leakage from pipes such as various pipes in chemical plants. As one of the leakage detection techniques, a leakage detection technique is known that detects a fluid leakage from a pipe by detecting a vibration due to the fluid leakage by using a vibration sensor.

In the leakage detection technique using a vibration sensor, the vibration sensor for detecting vibration is mounted on a pipe, a structure provided on the pipe (such as a fire hydrant), or the like. Then, the vibration sensor detects a vibration caused by leakage from the pipe, whereby the presence or absence of the fluid leakage from the pipe is detected. PTL 1 describes a water leakage detection device for calculating a water leakage position on the basis of a frequency of each vibration signal obtained by a sensor for detecting a mechanical vibration of each portion of a tap water pipe, frequency attenuation characteristic data of the tap water supply pipe, and length data of each portion of the tap water supply pipe.

CITATION LIST

Patent Literature

[PTL 1] Japanese Unexamined Patent Application Publication No. H01-276037

SUMMARY OF INVENTION

Technical Problem

In the technique described in PTL 1, it is stated that the sensor is mounted on a water supply pipe or a device attached to the water supply pipe. However, PTL 1 has no description about which position on the pipe should be the mounting position of the sensor. In other words, the technique described in PTL 1 has a problem in that the mounting position of the vibration sensor suitable for detecting a vibration of the pipe (hereinafter may be abbreviated as "leakage vibration") caused by a fluid leakage from the pipe is unclear.

The present invention has been accomplished to solve the problem. An object of the present invention is to provide a position determination device, a position determination system, a position determination method, and a computer-readable recording medium each of which are for determining a mounting position of a sensor for detecting a leakage vibration of a pipe.

Solution to Problem

A position determination device according to one aspect of the present invention includes frequency determination means for determining, based on characteristic values relating to a pipe and a structure attached to the pipe, a frequency of vibration propagating through the pipe and the structure, and mounting position determination means for determining, based on the determined frequency, a mounting position of a sensor for detecting vibration of the pipe.

Additionally, a position determination method according to an aspect of the present invention includes determining, based on characteristic values relating to a pipe and a structure attached to the pipe, a frequency of vibration propagating through the pipe and the structure, and determining, based on the determined frequency, a mounting position of a sensor for detecting vibration of the pipe.

Additionally, a computer-readable recording medium according to an aspect of the present invention non-transitorily stores a program for causing a computer to execute a process of determining, based on characteristic values relating to a pipe and a structure attached to the pipe, a frequency of vibration propagating through the pipe and the structure; and a process of determining, based on the determined frequency, a mounting position of a sensor for detecting vibration of the pipe.

Additionally, a position determination system according to an aspect of the present invention includes characteristic value acquisition means for receiving characteristic values relating to the pipe and the structure attached to the pipe, the position determination device according to an aspect of the present invention, and output means for outputting a mounting position of a sensor for detecting vibration of the pipe determined by the position determination device.

Advantageous Effects of Invention

According to the present invention, a position determination device, a position determination system, a position determination method, and a computer-readable recording medium each of which are for determining the mounting position of a sensor for detecting a leakage vibration of a pipe can be detected.

BRIEF DESCRIPTION OF DRAWINGS

FIG. 8 is a diagram illustrating a determination system according to a fifth example embodiment of the present invention.

FIG. 9A is a diagram illustrating a screen output to a display device by a characteristic value acquisition unit and an output unit of the determination system according to the fifth example embodiment of the present invention.

FIG. 9B is a diagram illustrating a screen output to the display device by the characteristic value acquisition unit and the output unit of the determination system according to the fifth example embodiment of the present invention.

FIG. 11 is a diagram illustrating a screen displayed by a characteristic value acquisition unit of a position determination system in the Example of the present invention.

DESCRIPTION OF EMBODIMENTS

Each of example embodiments and an Example of the present invention will be described with reference to the attached drawings. First will be a description of an example of a pipe in which a presence or absence of a leakage is to be detected and an example of a leakage detection device that are assumed in the present invention. After that, each of example embodiments of the present invention will be described.

Figure 13:
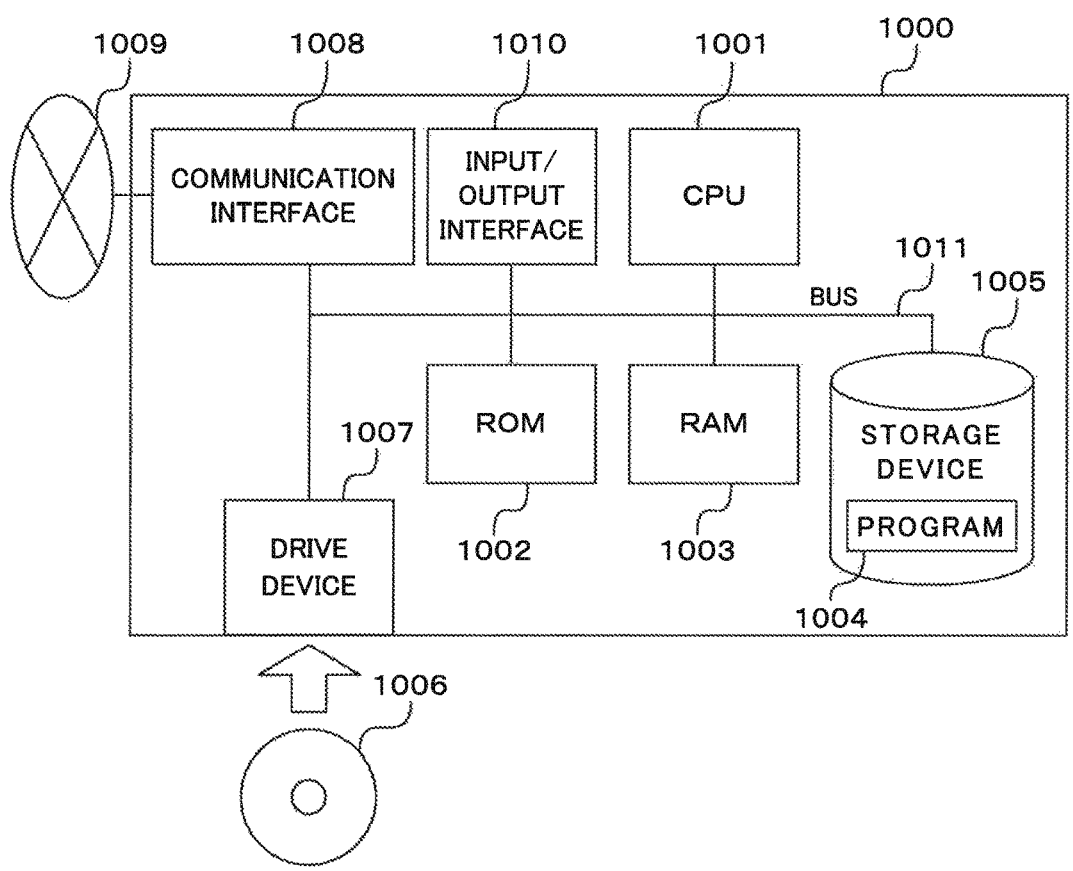
FIG. 13 is a diagram illustrating a structural example of an information processing device for actualizing the position determination device and the like in each example embodiment and the Example of the present invention.

In each of the example embodiments of the present invention, each constituent element of each device represents a block of a functional unit. Each constituent element of each device can be actualized, for example, by an optional combination of an information processing device 1000 and software, as illustrated in FIG. 13. The information processing device 1000 includes the following arrangement, as one example.

CPU (Central Processing Unit) 1001
ROM (Read Only Memory) 1002
RAM (Ramdom Access Memory) 1003
Program 1004 loaded in RAM 1003
Storage device 1005 storing program 1004
Drive device 1007 that performs reading and writing of storage medium 1006
Communication interface 1008 connected to communication network 1009
Input/output interface 1010 that performs input/output of data
Bus 1011 that connects each constituent element As for a method for actualizing each device, there are various modifications. For example, each device may be actualized as a dedicated device. Additionally, each device may be actualized by a combination of a plurality of devices.

First, with reference to FIG. 3, a description will be given of an example of the pipe in which the presence or absence of a leakage is to be detected and an example of the leakage detection device that are assumed in the present invention.

One example of the pipe assumed in the present invention includes at least a pipe 131 through which a fluid such as water flows and a structure 132 attached to the pipe.

The pipe 131 is, for example, buried in the ground. In a case in which the pipe 131 is a tap water supply pipe, the structure 132 is, for example, a fire hydrant, a gate valve, or a water supply meter that is connected to a pipe (however, the structure may be an object other than the exemplified ones as long as the structure is an object attached to a pipe). In addition, a leakage hole 150 can be formed in the pipe 131 due to deterioration. In this case, vibration due to leakage of the fluid flowing through an inside of the pipe 131 from the leakage hole 150 is caused.

One example of a leakage detection device 160 for detecting the fluid leakage in the pipe 131 includes a leakage determination unit 161 and a sensor 162. The sensor 162 detects vibration of the pipe. As the sensor 162, for example, a piezoelectric acceleration sensor is used. However, as the sensor 162, a freely-selected sensor capable of detecting vibration of a pipe, such as a vibration sensor or an acoustic sensor, is used. The leakage determination unit 161 determines the presence or absence of a fluid leakage from the pipe based on information with respect to the vibration of the pipe 131 detected by the sensor 162. The sensor 162 is mounted on the pipe 131 or the structure 132. In the case where the sensor 162 is mounted on the structure 132, the sensor 162 is mounted on a side surface 133 (a surface of the structure intersecting with a surface thereof attached to the pipe) or, for example, an upper surface 134 (a surface of the structure provided on a side opposite to the surface thereof attached to the pipe). The information with respect to the vibration of the pipe 131 acquired by the sensor 162 is transmitted to the leakage determination unit 161, as appropriate, by freely-selected communication means. The leakage detection device 160 can determine that a leakage is occurring in the pipe 131, for example, when the sensor 162 detects a vibration equal to or larger than a predetermined threshold value. In addition, for example, with use of a known method called correlation method, the leakage detection device 160 can determine a position where a leakage is occurring based on the vibrations detected by a plurality of sensors 162.

In the meantime, vibration due to leakage sometimes does not uniformly propagate through the pipe 131 and the structure 132 due to the diameter and the material of the pipe 131, the size, the material and the shape of the structure 132, or the like. In other words, there are places through which vibration due to leakage propagates with large amplitude and places through which the vibration propagates with small amplitude. In addition, vibration due to leakage may propagate with large amplitude in terms of vibration in a specific direction. When the sensor 162 is mounted on a place where the amplitude of a vibration due to a leakage of the pipe 131 becomes large, detection performance is improved, such as that a leakage occurring at a position farther away from the mounting position of the sensor 162 can be detected, for example. Accordingly, the position determination device and the like in the present invention determine a mounting position of the sensor, such as, for example, a position where the amplitude of a vibration due to leakage is large.

First Example Embodiment

Figure 1:
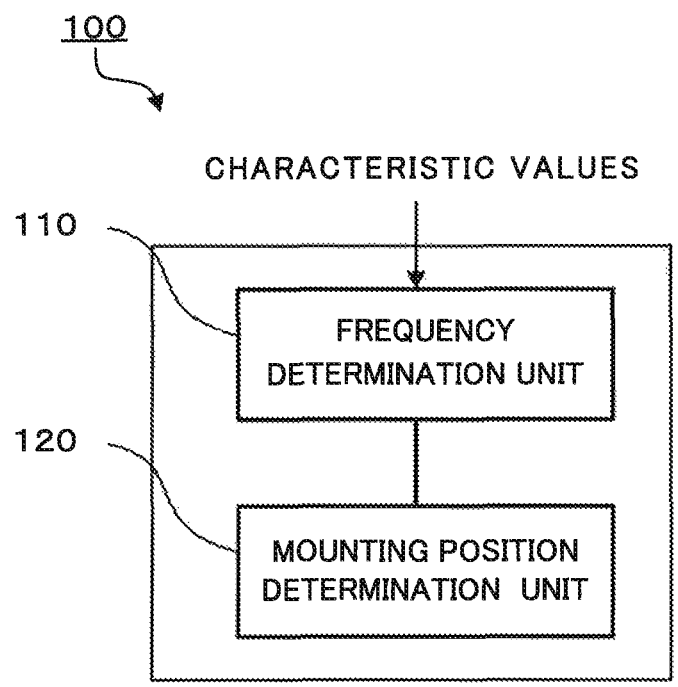
FIG. 1 is a diagram illustrating a position determination device according to a first example embodiment of the present invention.
Figure 2:
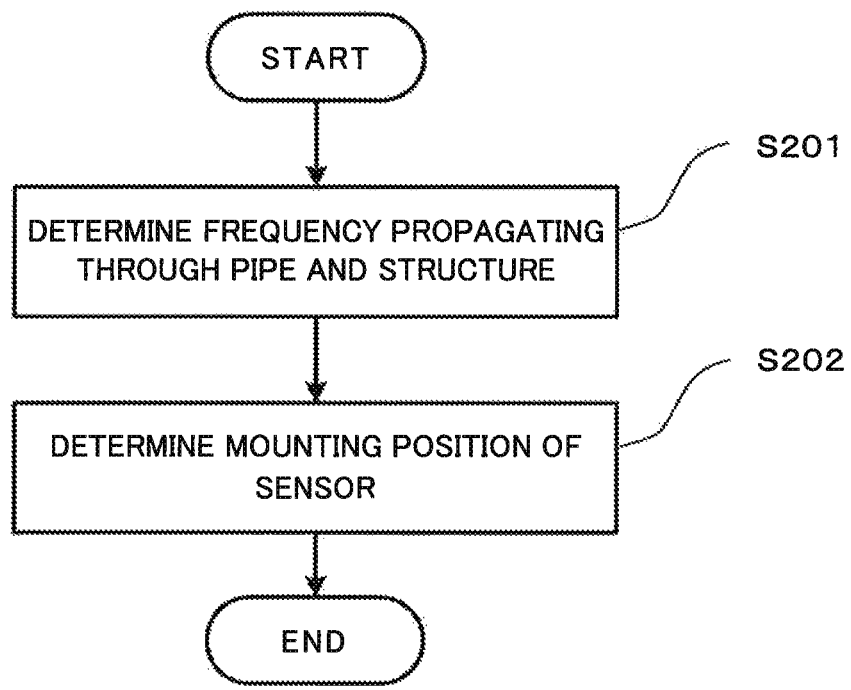
FIG. 2 is a flowchart illustrating operation of the position determination device according to the first example embodiment of the present invention.

Next, a first example embodiment of the present invention will be described. FIG. 1 is a diagram illustrating a position determination device according to the first example embodiment of the present invention. FIG. 2 is a flowchart illustrating operation of the position determination device according to the first example embodiment of the present invention.

As illustrated in FIG. 1, a position determination device 100 according to the first example embodiment of the present invention includes a frequency determination unit 110 and a mounting position determination unit 120. The frequency determination unit 110 determines, on the basis of characteristic values with respect to a pipe and a structure attached to the pipe, a frequency of vibration propagating through the pipe and the structure. The mounting position determination unit 120 determines, on the basis of the frequency determined by the frequency determination unit 110, a mounting position of a sensor for detecting the vibration of the pipe. As one example, the position determination device 100 may be actualized as a computer device including a CPU and a memory. Alternatively, the position determination device 100 may be actualized as a program that is executed by a server, a PC (Personal Computer), a microcomputer, or the like connected to a network. Other than those, the position determination device 100 may also be actualized as a hardware logic circuit. Additionally, the structure that is intended in the present example embodiment may be one already attached to the pipe or one that can be attached thereto later.

The frequency determination unit 110 determines, on the basis of characteristic values with respect to a pipe and a structure attached to the pipe, the frequency of vibration propagating through the pipe and the structure. In this case, the determined frequency may be a certain one or more frequencies or may be a frequency band. In addition, the frequency determination unit 110 determines, as the frequency of the vibration propagating through the pipe and the structure, a frequency having larger vibration amplitude as compared to other frequencies.

In general, the frequency of vibration propagating through a pipe changes in accordance with the size of the pipe. When the pipe has a small diameter, a relatively high frequency vibration propagates therethrough. When the pipe has a large diameter, a relatively low frequency vibration propagates therethrough. In this case, for example, when the diameter of the pipe is less than 500 mm (millimeters), the diameter thereof may be defined as being small, whereas when the diameter of the pipe is equal to or more than 500 mm, the diameter thereof may be defined as being large. Then, vibration having a frequency of less than 1 kHz may be defined as low frequency vibration, and vibration having a frequency of equal to or more than 1 kHz (kilohertz) may be defined as high frequency vibration. However, a value other than this may be used as a reference for the magnitude of the diameter of a pipe or the magnitude of frequency.

In addition, a structure has its own natural frequency in general. Accordingly, when a vibration having a frequency close to the natural frequency propagates from a pipe, the structure tends to vibrate with large amplitude.

The frequency determination unit 110 determines the frequency of vibration propagating through the pipe and the structure in accordance with the above-described principle. In other words, the frequency determination unit 110 determines the frequency of the vibration propagating through the pipe and the structure, for example, by obtaining natural frequencies of the pipe and the structure. Additionally the frequency determination unit 110 determines the frequency of the vibration propagating through the pipe and the structure by obtaining a frequency band at which the vibration attenuates in the pipe and the structure, as another example.

The characteristic values with respect to the structure that are used by the frequency determination unit 110 include a size, a material, a shape of the structure, or the like. In addition, the characteristic values with respect to the pipe that are used by the frequency determination unit 110 include a diameter, a material of the pipe, or the like. However, the characteristic values that are used by the frequency determination unit 110 are not limited thereto. The frequency determination unit 110 may use, other values influential on the vibration propagation in the pipe and the structure as the characteristic values. For example, the frequency determination unit 110 may use a temperature of the pipe or the structure, characteristics of a fluid flowing through the inside of the pipe (for example, a medium and a temperature of the fluid), or the state of soil around the pipe or the structure as the characteristic values.

The mounting position determination unit 120 determines, on the basis of the frequency determined by the frequency determination unit 110, a mounting position of a sensor for detecting the vibration of the pipe. The mounting position determination unit 120 determines the mounting position, for example, in such a manner as to mount the sensor onto a surface of the structure. In this case, the determined mounting position may be a certain one point of the pipe or the structure, or may be a certain region of the pipe or the structure.

Figure 3:
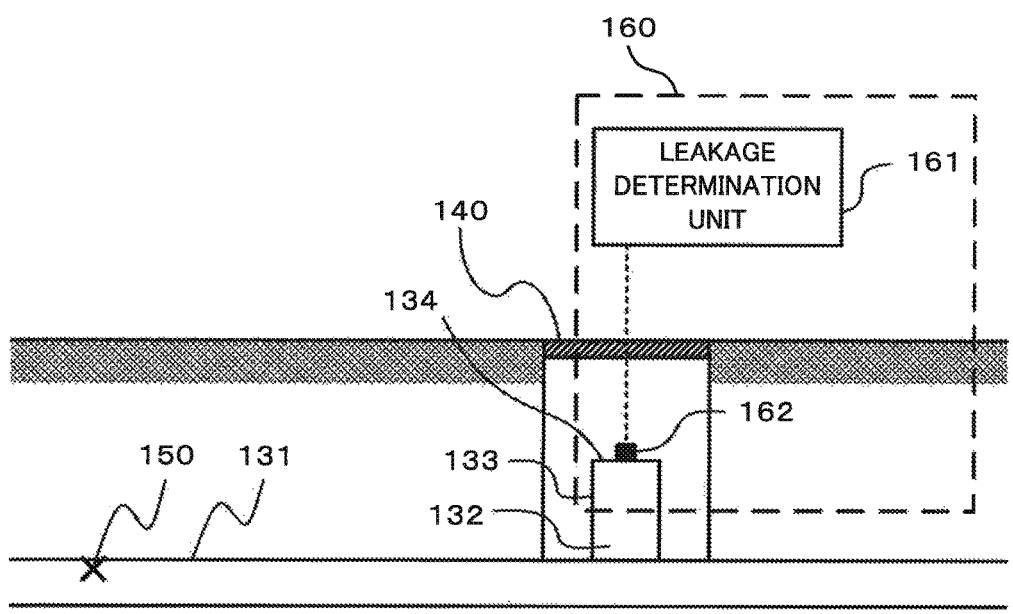
FIG. 3 is a diagram illustrating an example of a pipe in which the presence or absence of a leakage is to be detected and an example of a leakage detection device that are assumed in the present invention.

Generally, when low frequency vibration propagates through a pipe, a structure attached to the pipe may sway in a lateral direction of FIG. 3 (i.e., a direction along which the pipe extends). In this case, assuming that the sensor detects vibration in a direction intersecting with a ground plane (for example, a direction orthogonal to the ground plane), the sensor may be mounted on a side surface of the structure. Then, the sensor can detect the vibration with high sensitivity.

In addition, when high frequency vibration propagates through a pipe, a structure attached to the pipe can sway along a vertical direction of FIG. 3 (i.e., a direction intersecting with the direction along which the pipe extends). In this case, assuming that the sensor detects vibration in the direction intersecting with the ground plane, the sensor may be mounted on an upper surface of the structure. Then, the sensor can detect the vibration with high sensitivity.

The mounting position determination unit 120 can determine a position other than those mentioned above as a part determined for the sensor. The mounting position determination unit 120 may determine, for example, a base for attaching the structure to the pipe as the mounting position. In addition, the mounting position determination unit 120 may determine, as the mounting position, a certain position on a pipe wall of the pipe (for example, a position at which, from the state of placement of the structure, the vibration amplitude at the frequency determined by the frequency determination unit 110 can be determined to become large).

Namely, when the frequency determination unit 110 determines a frequency propagating through the pipe and the structure, it is possible to determine a direction in which the pipe and the structure vibrate in accordance with the determined frequency. The mounting position determination unit 120 can determine the mounting position of the sensor so that the direction in which the pipe and the structure vibrate may be the same as a direction in which the sensor detects the vibration, on the basis of the frequency determined by the frequency determination unit 110.

In accordance with such a principle, the mounting position determination unit 120 can determine, on the basis of the frequency determined by the frequency determination unit 110, the mounting position of the sensor for detecting the vibration of the pipe.

Next, operation of the position determination device 100 according to the first example embodiment of the present invention will be described using FIG. 1 and FIG. 2.

First, the frequency determination unit 110 determines the frequency of vibration propagating through the pipe and the structure (Step S201). As previously described, the frequency determination unit 110 determines the frequency on the basis of the characteristic values with respect to the pipe and the structure.

In this step, the frequency determination unit 110 may acquire the characteristic values that are used for determining the frequency in advance. In addition, the frequency determination unit 110 may acquire the characteristic values for use in determining the frequency as needed upon execution of the present step.

Next, the mounting position determination unit 120 determines the mounting position of the sensor for detecting the vibration of the pipe (Step S202). As previously described, the mounting position determination unit 120 determines the mounting position on the basis of the frequency determined by the frequency determination unit 110.

As described hereinabove, the position determination device 100 of the present example embodiment can determine, on the basis of the vibration propagating through the pipe and the structure, the mounting position of the sensor for detecting the vibration of the pipe. In other words, the vibration of the pipe and the structure caused by the leakage from the pipe is likely to propagate to the mounting position determined by the position determination device 100 of the present example embodiment. Accordingly, by setting the sensor based on the mounting position determined by the position determination device 100 of the present example embodiment, possibility of detecting the leakage from the pipe by the leakage detection device may be increased. Thus, the position determination device 100 of the present example embodiment may determine the mounting position of the sensor for detecting the leakage vibration of the pipe.

Second Example Embodiment

Figure 4:
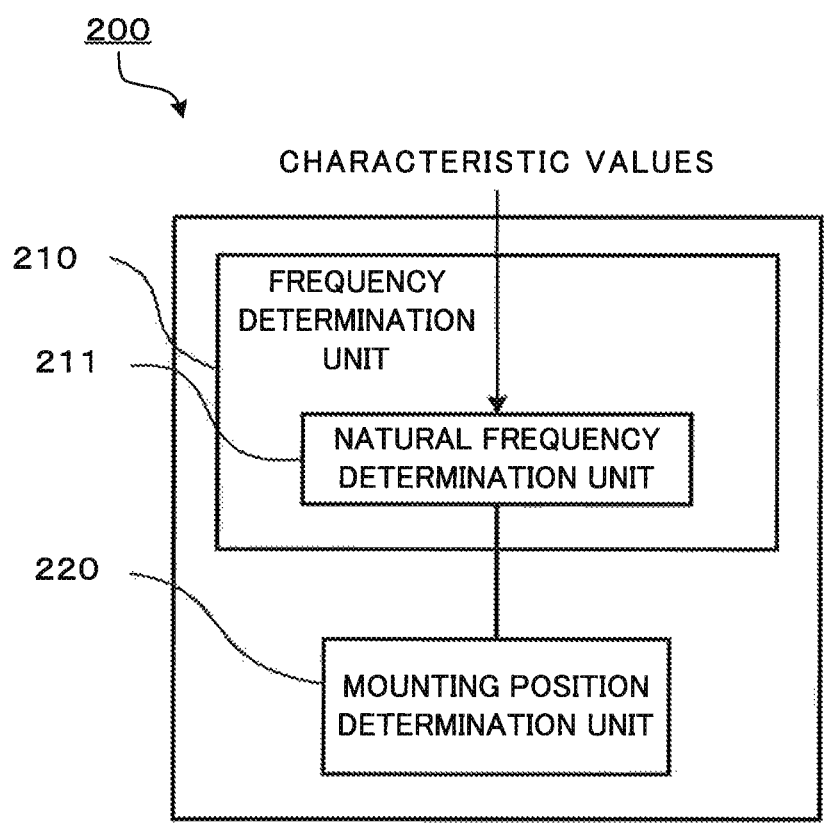
FIG. 4 is a diagram illustrating a position determination device according to a second example embodiment of the present invention.

Next, a third example embodiment of the present invention will be described. FIG. 4 is a diagram illustrating a position determination device according to the second example embodiment of the present invention.

As illustrated in FIG. 4, a position determination device 200 according to the second example embodiment of the present invention includes a frequency determination unit 210 and a mounting position determination unit 220, and the frequency determination unit 210 includes a natural frequency determination unit 211. The natural frequency determination unit 211 determines the natural frequency of the structure.

In other words, the position determination device 200 according to the second example embodiment of the present invention is different from the position determination device 100 according to the first example embodiment in that the frequency determination unit 210 includes the natural frequency determination unit 211. Elements other than this are configured in the same manner as those in the position determination device 100 according to the first example embodiment.

The natural frequency determination unit 211 determines the natural frequency of the structure on the basis of characteristic values relating to the vibration propagation of the pipe and the structure. As one example, the natural frequency determination unit 211 may construct a model of the structure portion by acquiring the shape, the size, the material, or the like of the structure as the characteristic values, and may calculate the natural frequency using the model by a finite element method. Alternatively, the natural frequency determination unit 211 may calculate a natural frequency by any other calculation method. As a method other than this, the natural frequency determination unit 211 may acquire an experimentally obtained natural frequency of the structure as the characteristic value to determine the natural frequency of the structure. Alternatively, the natural frequency determination unit 211 may determine the natural frequency of the structure by acquiring, as the characteristic value, a theoretical value of the natural frequency of the structure calculated in advance by a freely-selected method.

In the present example embodiment, the mounting position determination unit 220 may determine the mounting position of the sensor on the basis of the natural frequency of the structure determined by the natural frequency determination unit 211. In this case, the mounting position determination unit 220 may determine the mounting position of the sensor on the basis of a primary natural frequency of the structure. In addition, the mounting position determination unit 220 may determine the mounting position of the sensor on the basis of a higher-order (for example, secondary or third) natural frequency of the structure. Furthermore, the mounting position determination unit 220 may determine the mounting position by additionally using information of the pipe, such as, for example, a diameter thereof or the like.

As described hereinabove, the position determination device 200 according to the present example embodiment determines the mounting position of the sensor on the basis of the natural frequency of the structure determined by the natural frequency determination unit 211 included in the frequency determination unit 210. In other words, the position determination device 200 according to the present example embodiment may determine the mounting position of the sensor suitable for detecting the leakage vibration of the pipe by determining at least the frequency of vibration propagating through the structure.

Third Example Embodiment

Figure 5:
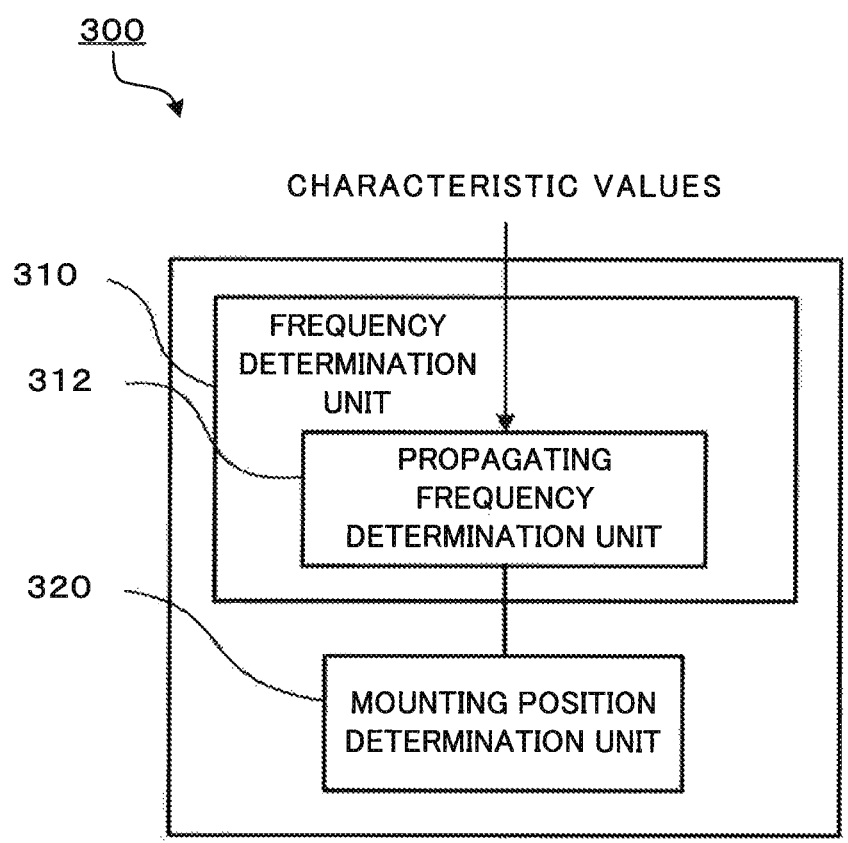
FIG. 5 is a diagram illustrating a position determination device according to a third example embodiment of the present invention.

Next, a third example embodiment of the present invention will be described. FIG. 5 is a diagram illustrating a position determination device according to the third example embodiment of the present invention.

As illustrated in FIG. 5, a position determination device 300 according to the third example embodiment of the present invention includes a frequency determination unit 310 and a mounting position determination unit 320, and the frequency determination unit 310 includes a propagating frequency determination unit 312. The propagating frequency determination unit 312 determines the frequency of vibration propagating through the pipe.

In other words, the position determination device 300 according to the third example embodiment of the present invention is different from the position determination device 100 according to the first example embodiment in that the frequency determination unit 310 includes the propagating frequency determination unit 312. Elements other than this are configured in the same manner as those in the position determination device 100 according to the first example embodiment.

The propagating frequency determination unit 312 determines a 20 frequency band of vibration propagating through the pipe. As one example, the propagating frequency determination unit 312 acquires the diameter and the material of the pipe as characteristic values, and determines the frequency band of vibration propagating through the pipe on the basis of the acquired characteristic values. The propagating 25 frequency determination unit 312 may also use the temperature of the pipe, the characteristics of a fluid flowing through the pipe (for example, the medium and the temperature of the fluid), and characteristics of soil around the pipe as the characteristic values. In addition, the propagating frequency determination unit 312 may obtain a frequency band at which the vibration attenuates in the pipe, on the basis of the characteristic values. In this case, the propagating frequency determination unit 312 determines a band other than the frequency band at which the vibration attenuates in the pipe as the frequency band of vibration propagating through the pipe. In 5 this case, the determined frequency may be a frequency band or one or more certain frequencies.

In the present example embodiment, the mounting position determination unit 320 determines the mounting position of the sensor on the basis of the frequency band of vibration propagating through the pipe determined by the propagating frequency determination unit 312. In addition, the mounting position determination unit 320 may additionally use any information relating to the structure to determine the mounting position. Assuming that the sensor detects vibration in the direction orthogonal to the ground plane, the mounting position determination unit 320 may determine the upper surface of the structure as the mounting position, for example, when it is determined that low frequency vibration propagates through the pipe. Alternatively, on the same assumption, the mounting position determination unit 320 can determine a side surface of the structure as the mounting position, for example, when it is determined that high frequency vibration propagates through the pipe.

As described hereinabove, the position determination device 300 of the present example embodiment determines the mounting position of the sensor on the basis of the frequency band of vibration propagating through the pipe determined by the propagating frequency determination unit 312 included in the frequency determination unit 310. In other words, the position determination device 300 of the present example embodiment may determine the mounting position of the sensor suitable for detecting the leakage vibration of the pipe by determining at least the frequency of vibration propagating through the pipe.

Fourth Example Embodiment

Figure 6:
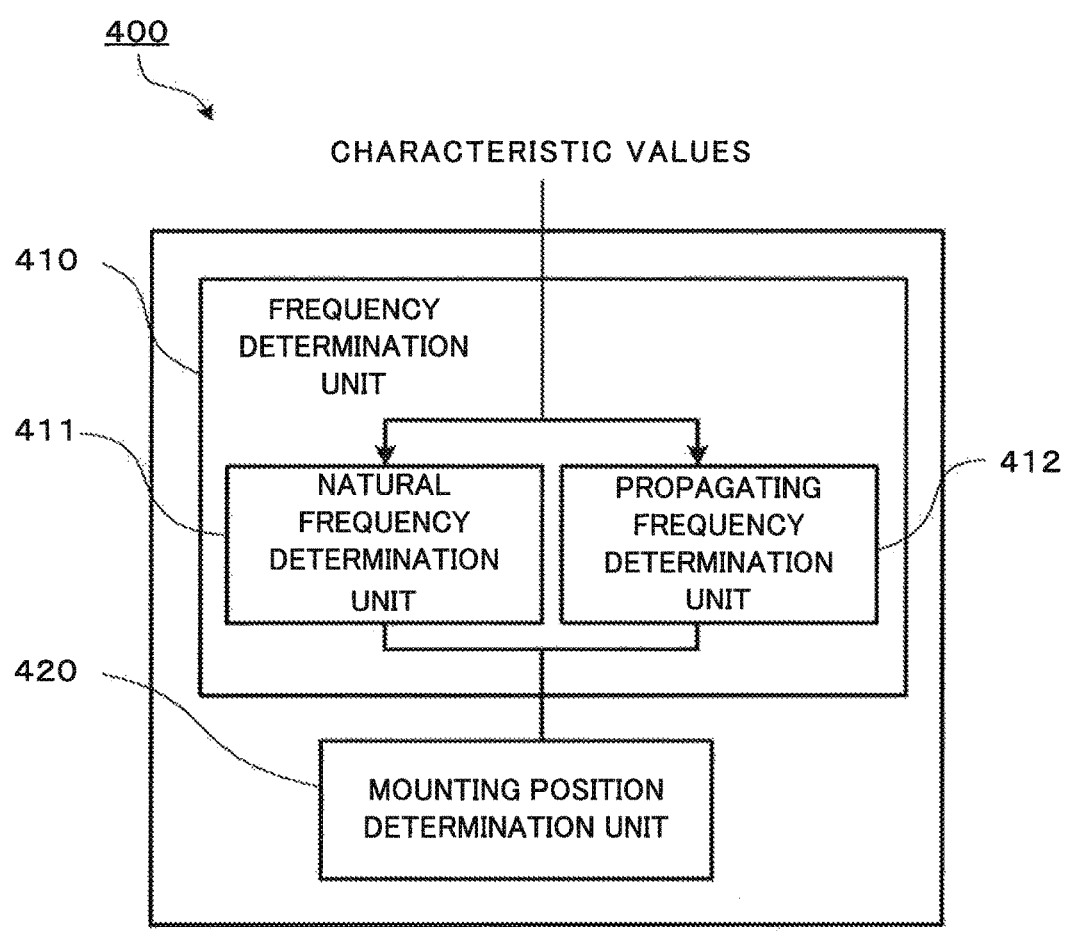
FIG. 6 is a diagram illustrating a position determination device according to a fourth example embodiment of the present invention.
Figure 7A:
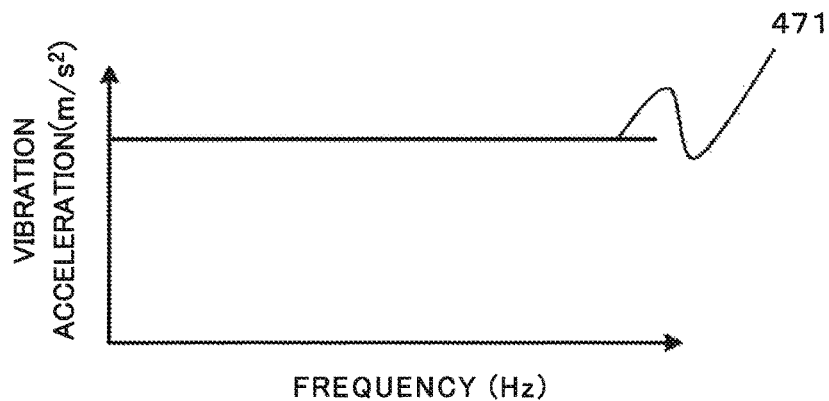
FIG. 7A is a graph illustrating a frequency determination process by a frequency determination unit of the position determination device according to the fourth example embodiment of the present invention.
Figure 7B:
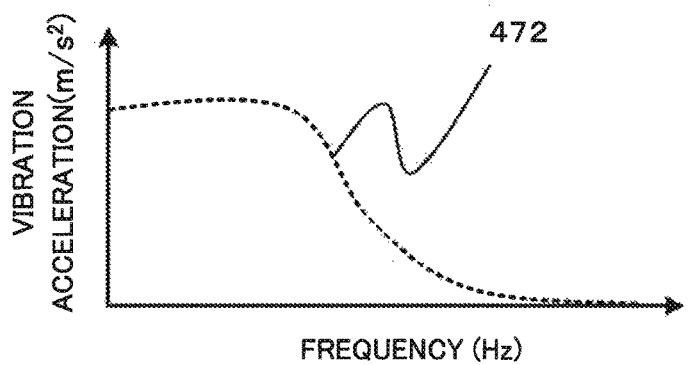
FIG. 7B is a graph illustrating the frequency determination process by the frequency determination unit of the position determination device according to the fourth example embodiment of the present invention.
Figure 7C:
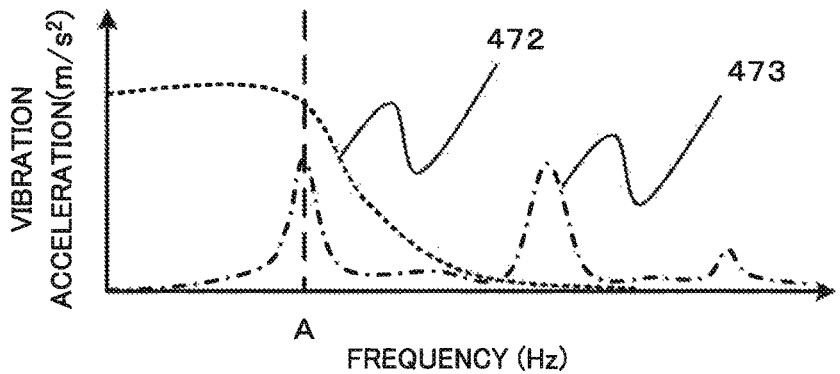
FIG. 7C is a graph illustrating the frequency determination process by the frequency determination unit of the position determination device according to the fourth example embodiment of the present invention.

Next, a fourth example embodiment of the present invention will be described. FIG. 6 is a diagram illustrating a position determination device according to the fourth example embodiment of the present invention. FIGS. 7A, 7B, and 7C are graphs illustrating a frequency determination process by a frequency determination unit of the position determination device according to the fourth example embodiment of the present invention.

As illustrated in FIG. 6, a position determination device 400 according to the fourth example embodiment of the present invention includes a frequency determination unit 410 and a mounting position determination unit 420, and the frequency determination unit 410 includes a natural frequency determination unit 411 and a propagating frequency determination unit 412.

In other words, the position determination device 400 according to the fourth example embodiment of the present invention is different from the position determination device 400 according to the first example embodiment in that the frequency determination unit 410 includes the natural frequency determination unit 411 and the propagating frequency determination unit 412. Elements other than this are configured in the same manner as those in the position determination device 400 according to the first example embodiment. In addition, the natural frequency determination unit 411 of the present example embodiment may be configured in the same manner as the natural frequency determination unit 211 of the second example embodiment. Furthermore, the propagating frequency determination unit 412 of the present example embodiment may be configured in the same manner as the propagating frequency determination unit 312 according to the third example embodiment.

The frequency determination unit 410 determines the frequency of vibration propagating through the pipe and the structure on the basis of a natural frequency of the structure determined by the natural frequency determination unit 411 and a frequency band of the vibration propagating through the pipe determined by the propagating frequency determination unit 412. Details of a frequency determination method by the frequency determination unit 410 will be described with reference to each of FIGS. 7A, 7B, and 7C.

For example, assume that, like vibration due to a fluid leakage from the pipe, a vibration is occurring at a certain position on a pipe. In this case, for example, the vibration is occurring like a frequency spectrum 471 of FIG. 7A at the position. The vibration is occurring at constant or substantially constant vibration acceleration with respect to frequency.

This vibration propagates through the pipe. In this case, in accordance with the characteristic values such as the diameter and the material of the pipe, a vibration having a specific frequency band propagates. Additionally, in accordance with the characteristic values such as the diameter and the material of the pipe, the vibration of a specific frequency band attenuates.

The propagating frequency determination unit 412 determines the frequency band of the vibration propagating through the pipe, for example, by using the diameter, the material, or the like of the pipe as characteristic values. As one example, a specified result is illustrated like a frequency spectrum 472 of the propagating vibration in FIG. 7B or FIG. 7C.

The vibration propagating through the pipe further propagates to the structure. In this case, the vibration propagating through the pipe propagates to the structure in accordance with the natural frequency of the structure.

In this case, the natural frequency determination unit 411 determines the natural frequency of the structure. As one example, the determined result is illustrated, for example, like a frequency spectrum 473 of a natural frequency in FIG. 7C.

The frequency determination unit 410 determines the frequency of the vibration propagating through the pipe and the structure on the basis of the frequency spectra 472 and 473. In this case, the frequency determination unit 410 determines a frequency that is included in the frequency determined by the natural frequency determination unit 411 and that is included in the frequency determined by the propagating frequency determination unit 412, as the frequency of the vibration propagating through the pipe and the structure. In the example illustrated in FIG. 7C, a frequency A is included in the frequency band of the vibration propagating through the pipe, as illustrated by the frequency spectrum 472, and is also included in the primary natural frequency of the structure as illustrated by the frequency spectrum 473. Accordingly, the frequency determination unit 410 determines, for example, the frequency A as the frequency of the vibration propagating through the pipe and the structure. The frequency determination unit 110 may also determine a frequency in a predetermined range from the frequency A as the frequency of the vibration propagating through the pipe and the structure.

Then, the mounting position determination unit 420 determines the mounting position of the sensor on the basis of the frequency of the vibration propagating through the pipe and the structure determined by the frequency determination unit 410. In the case illustrated in each of FIG. 7A to FIG. 7C, the determined frequency is relatively low. Thus, the mounting position determination unit 420 determines, for example, a side surface of the structure as the mounting position.

As described hereinabove, in the position determination device 400 of the present example embodiment, the frequency determination unit 410 includes the natural frequency determination unit 411 and the propagating frequency determination unit 412. Thus, the frequency determination unit 410 may more accurately determine the frequency of the vibration propagating through the pipe and the structure. Accordingly, the position determination device 400 of the present example embodiment may more accurately determine the mounting position of the sensor suitable for detecting the leakage vibration of the pipe.

Fifth Example Embodiment

Next, a fifth example embodiment of the present invention will be described. FIG. 8 is a block diagram illustrating the structure of a position determination system according to the fifth example embodiment of the present invention. FIG. 9A and FIG. 9B are diagrams illustrating screens output to a display device by a characteristic value acquisition unit and an output unit of the determination system according to the fifth example embodiment of the present invention. According to FIG. 8, a position determination system 50 according to the fifth example embodiment of the present invention includes the characteristic value acquisition unit 501, a position determination device 500, and the output unit 502. The characteristic value acquisition unit 501 acquires characteristic values with respect to a pipe and a structure attached to the pipe. The position determination device 500 is the position determination device according to each example embodiment of the present invention or a modification thereof. The output unit 502 outputs a mounting position of a sensor for detecting the vibration of the pipe determined by the position determination device 500.

The characteristic value acquisition unit 501 acquires characteristic values with respect to the pipe and the structure attached to the pipe. The characteristic value acquisition unit 501 can be configured to directly acquire characteristic values including the diameter and the material of the pipe and the size, the material, or the shape of the structure in a form of numerical values or the like. In this case, the characteristic value acquisition unit 501 may include an arrangement in which an input screen is displayed on a freely-selected display device, for example, as illustrated in FIG. 9A. In addition, the characteristic value acquisition unit 501 may acquire the characteristic values with respect to the pipe and the structure by reading information relating to a drawing of the pipe or the structure.

Besides, the characteristic value acquisition unit 501 may include a database including information relating to commonly used pipes or structures. In this case, for example, on the basis of the model number of a designated pipe or structure, the characteristic value acquisition unit 501 reads information of the pipe or structure from the database and thereby may acquire characteristic values with respect to the intended pipe and structure. Additionally, in this case, the characteristic value acquisition unit 501 may also be configured to add the information relating to the intended pipe or structure as information related to a new pipe or structure to the database.

The position determination device 500 outputs the mounting position of the sensor for detecting the vibration of the pipe on the basis of the characteristic values acquired by the characteristic value acquisition unit 501. The position determination device 500 is configured by any of the position determination devices of the respective first through fourth example embodiments of the present invention or any modification thereof. The position determination device 500 may be determined as appropriate on the basis of the configuration of a pipe to be detected and position determination accuracy to be required.

The output unit 502 outputs the mounting position of the sensor for detecting the vibration of the pipe determined by the position determination device 500. The output unit 502 is actualized, for example, in such a manner that displays an output screen on a freely-selected display unit, as illustrated in FIG. 9B. In this case, the output unit 502 illustrates a structure on the display unit, and may indicate a mounting position 503 of the sensor specified in the illustrated structure. However, the output unit 502 may indicate the mounting position of the sensor in a manner other than this. For example, the output unit 502 may notify the mounting position of the sensor to a user by indicating a distance from a certain position of the structure.

As described hereinabove, the position determination system 50 of the present example embodiment includes the characteristic value acquisition unit 501 and the output unit 502 in addition to the position determination device 500 according to the first through fourth example embodiments of the present invention. The inclusion of the characteristic value acquisition unit 501 and the output unit facilitates determination of characteristic values that are used by the position determination device 500 and confirmation of the specified mounting position of the sensor. Accordingly, the position determination system of the present example embodiment allows the user to easily know the specified mounting position of the sensor.

EXAMPLES

Figure 10:
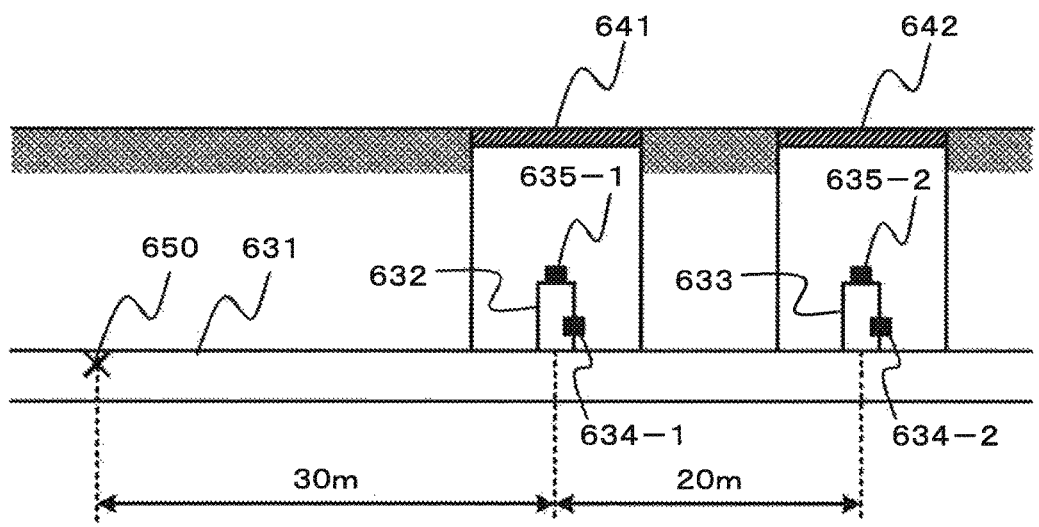
FIG. 10 is a diagram illustrating a state of a pipe to which sensors are to be attached in an Example of the present invention.
Figure 12A:
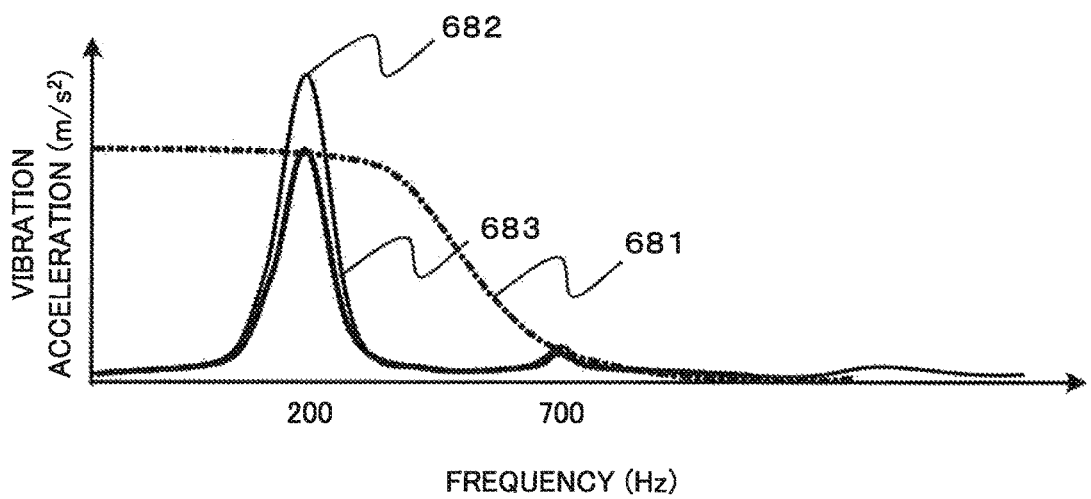
FIG. 12A is a diagram illustrating a situation of frequency determination by a frequency determination unit included in a position determination device of the position determination system in the Example of the present invention.
Figure 12B:
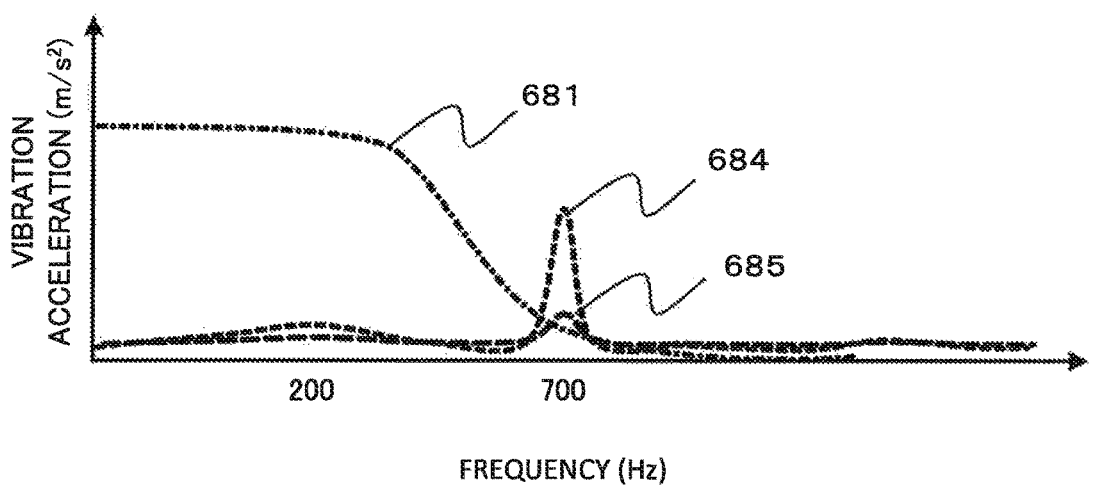
FIG. 12B is a diagram illustrating a situation of frequency determination by the frequency determination unit included in the position determination device of the position determination system in the Example of the present invention.

Next will be a description of an example of determining a mounting position of a sensor for use in a leakage detection device by using the position determination system according to the present invention. FIG. 10 is a diagram illustrating the state of a pipe where the sensor is to be mounted in the present Example. FIG. 11 is a diagram illustrating a screen displayed by the characteristic value acquisition unit of the position determination system in the Example of the present invention. FIGS. 12A and 12B are diagrams illustrating situations of determining frequencies by the frequency determination unit included in the position determination device of the position determination system in the present Example. In the present Example, the position determination system includes the position determination device 400 according to the fourth example embodiment of the present invention.

FIG. 10 illustrates an example of a pipe in which the leakage detection device determines a presence or absence of a leakage in the present Example. In the present Example, assume that a tap water supply pipe 631 is buried in the ground. The material of the tap water supply pipe 631 is a ductile cast iron pipe. Additionally, the tap water supply pipe 631 has a pipe diameter of φ 500 mm. Assume that water leakage is occurring from a leakage point 650 of the tap water supply pipe 631.

Assume that there is a manhole 641 at a position apart by 30 m from the leakage point 650. In addition, assume that there is a manhole 642 at a position apart by 20 m from the manhole 641. Assume that underground single-port fire hydrants 632 and 633 of the same type, respectively, are provided in the manholes 641 and 642. The material of the underground single-port fire hydrants 632 and 633 is cast iron. The size of the underground single-port fire hydrants 632 and 633 is 420×235×480 mm.

The above-described position determination system 50 was used in order to determine the mounting position of the sensor included in the leakage detection device. First, characteristic values of the underground single-port fire hydrants 632 and 633 and the tap water supply pipe 631 were input on an input screen as illustrated in FIG. 11 displayed by the characteristic value acquisition unit 501 of the position determination system 50 by a user of the position determination system 50. In the same way, for the characteristic values of the underground single-port fire hydrants 632 and 633, the values of the size, the material, and the shape were extracted from a drawing thereof and input by the user of the position determination system 50. In addition, for the characteristic values of the tap water supply pipe 631, the above-mentioned material and diameter were input by the user of the position determination system 50.

Using the characteristic values of the tap water supply pipe 631, the position determination system calculated a frequency band where the vibration propagates due to mechanical characteristics of the tap water supply pipe 631. A frequency spectrum 681 of FIG. 12A and FIG. 12B illustrates the calculated frequency band. Additionally, the position determination system calculated a natural frequency of the underground single-port fire hydrants 632 and 633. Using the frequency band and the natural frequency, the position determination system specified the mounting position of the sensor. Specifically, due to the size of the tap water supply pipe 631, low frequency tends to propagate, as illustrated by the frequency spectrum 681 of FIG. 12A and FIG. 12B. Due to this, when the tap water supply pipe 631 vibrates, the underground single-port fire hydrants 632 and 633 tend to sway in a lateral direction of FIG. 10. Accordingly, the position determination system 50 specified the position so that the sensor was arranged on side surfaces of the underground single-port fire hydrants 632 and 633. On the basis of the determination result, the sensor of the leakage detection device was arranged on respective side surfaces 634-1 and 634-2 of the underground single-port fire hydrants 632 and 633. As a Comparative Example, the sensor of the leakage detection device was arranged on respective upper surfaces 635-1 and 635-2 of the underground single-port fire hydrants 632 and 633. In both cases, directions orthogonal to the installed surfaces were defined as detection directions for the sensors.

By using the sensors installed as above, the leakage detection device measured the presence or absence of water leakage from the tap water supply pipe 631. In this case, since the water leakage is occurring from the leakage point 650 of the tap water supply pipe 631, an operation expected to the leakage detection device is that the leakage detection device determines that there is a leakage.

Frequency spectra illustrated by 682 and 683, respectively, in FIG. 12A were obtained from the sensors respectively arranged on the side surfaces 634-1 and 634-2 of the underground single-port fire hydrants 632 and 633. The frequency spectra had a peak at approximately 200 Hz. The frequency, as indicated by the frequency spectrum 681, is included in the band calculated by the position determination system as the frequency band where the vibration propagates. Then, at the sensor arranged on the 634-2 of the underground single-port fire hydrant 633 located at a place apart from the leakage position 650, the spectrum peak was also recognizable, as illustrated by the frequency spectrum 683.

On the other hand, frequency spectra indicated by 684 and 685, respectively, in FIG. 12B were obtained from the sensors respectively arranged on the upper surfaces 635-1 and 635-2 of the underground single-port fire hydrants 632 and 633. The frequency spectra had a peak at approximately 700 Hz. The frequency, as indicated by the spectrum 681 of FIGS. 12A and 12B, is outside the band calculated by the position determination system as the frequency band where the vibration propagates. Then, on the upper surface 635-2 of the underground single-port fire hydrant 633 located at a position apart from the leakage position 650, no clear spectral peak was recognizable, as illustrated by the frequency spectrum 685.

The leakage detection device determined the presence or absence of a leakage in the tap water supply pipe 631 based on each of the frequency spectra 682 to 685 described above. The leakage detection device used, as a threshold value, an amplitude twice the amplitude of an average value of background vibration that was a vibration when there was no occurrence of leakage. Then, the leakage detection device determined that leakage was occurring, when the amplitude of the peak in each frequency spectrum obtained by the sensor exceeded the threshold value. Table 1 illustrates the results. When the leakage was determined to be occurring, symbol o (OK) was given, whereas when the leakage was not determined to be occurring, symbol x (NG) was given.

TABLE 1

|  | Sensor mounted on fire hydrant 632 | Sensor mounted on fire hydrant 633 |
|---|---|---|
| Sensor mounted on side surface 634 of fire hydrant (specified by position determination system of the present invention) | ○ (Frequency spectrum 682) | ○ (Frequency spectrum 683) |
| Sensor mounted on upper surface 635 of fire hydrant (Comparative Example) | ○ (Frequency spectrum 684) | x (Frequency spectrum 685) |

When the sensor was mounted at the position specified by the position determination system of the present invention, the leakage detection device correctly determined the occurrence of the leakage from the tap water supply pipe 631 on the basis of vibration detected by both sensors. However, in the Comparative Example, the leakage detection device failed to detect the occurrence of the leakage from the tap water supply pipe 631 on the basis of vibration detected by the sensor mounted on the side surface 635-2 of the underground single-port fire hydrants 633.

In other words, mounting the sensor at the position specified by the position determination system of the present invention enabled the leakage detection device to detect the leakage located at a position more distant from the sensor.

While the invention of the present application has been described with reference to the example embodiments and the Example hereinabove, the invention of the present application is not limited to the example embodiments and the Example described above. Various modifications understandable for those skilled in the art can be made in the configurations and details of the invention of the present application within the scope of the invention thereof. In addition, the configurations in each example embodiment and each Example can be combined with each other without departing from the spirit of the present invention.

This application is based upon and claims the benefit of priority from Japanese patent application No. 2014-123450 filed on Jun. 16, 2014, the disclosure of which is incorporated herein in its entirety.

REFERENCE SIGNS LIST

50 Position determination system
100, 200, 300, 400, 500 Position determination device
110, 210, 310, 410 Frequency determination unit
211, 411 Natural frequency determination unit
312, 412 Propagating frequency determination unit
120, 220, 320, 420 Mounting position determination unit
131 Pipe
132 Structure
133 Side surface
134 Upper surface
150 Leakage hole
160 Leakage detection device
161 Leakage determination unit
162 Sensor
471, 472, 473 Frequency spectrum
501 Characteristic value acquisition unit
502 Output unit
503 Mounting position
631 Tap water supply pipe
632, 633 Underground single-port fire hydrant
634 Side surface
635 Upper surface
641, 642 Manhole
650 Leakage position
681, 682, 683, 684, 685 Frequency spectrum
1000 Information processing device
1001 CPU
1002 ROM
1003 RAM
1004 Program
1005 Storage device
1006 Storage medium
1007 Drive device
1008 Communication interface
1009 Communication network
1010 Input/output interface
1011 Bus

The invention claimed is:

1. A position determination device comprising:
at least one processor configured to act as:
a frequency determination unit configured to determine, based on characteristic values relating to a pipe and a structure attached to the pipe, a frequency of vibration propagating through the pipe and the structure; and
a mounting position determination unit configured to determine, based on the determined frequency, a mounting position of a sensor for detecting vibration of the pipe.

2. The position determination device according to claim 1, wherein the frequency determination unit includes a natural frequency determination unit configured to determine a natural frequency of the structure.

3. The position determination device according to claim 1, wherein the frequency determination unit includes a propagating frequency determination unit configured to determine a frequency of vibration propagating through the pipe.

4. The position determination device according to claim 1, wherein the frequency determination unit includes a natural frequency determination unit configured to determine a natural frequency of the structure and a propagating frequency determination unit configured to determine a frequency of vibration propagating through the pipe, and the frequency determination unit determines, as a frequency of vibration propagating through the pipe and the structure, a frequency included in the frequency determined by the natural frequency determination unit and a frequency included in the frequency determined by the propagating frequency determination unit.

5. The position determination device according to claim 1, wherein the mounting position determination unit determines an upper surface or a side surface of the structure as the mounting position.

6. The position determination device according to claim 1, wherein the characteristic values include at least one of a diameter of the pipe, a material of the pipe, a size of the structure, a material of the structure, or a shape of the structure.

7. A position determination system comprising:
at least one processor configured to act as a characteristic value acquisition unit configured to receive characteristic values relating to the pipe and the structure attached to the pipe;
the position determination device according to any one of claim 1; and
at least one processor configured to act as an output unit configured to output the mounting position of the sensor for detecting the vibration of the pipe determined by the position determination device.

8. A position determination method comprising:
    determining, based on characteristic values relating to a pipe and a structure attached to the pipe, a frequency of vibration propagating through the pipe and the structure; and
    determining, based on the determined frequency, a mounting position of a sensor for detecting vibration of the pipe.

9. A computer-readable recording medium storing a program for causing a computer to execute:
    a process of determining, based on characteristic values relating to a pipe and a structure attached to the pipe, a frequency of vibration propagating through the pipe and the structure; and
    a process of determining, based on the determined frequency, a mounting position of a sensor for detecting vibration of the pipe.

* * * * *